3,016,884
FLUID EXPANSION UNIT
Henry H. Merriman, 751 W. Washington St., Jackson, Mich.
Filed Oct. 31, 1958, Ser. No. 771,113
7 Claims. (Cl. 121—48)

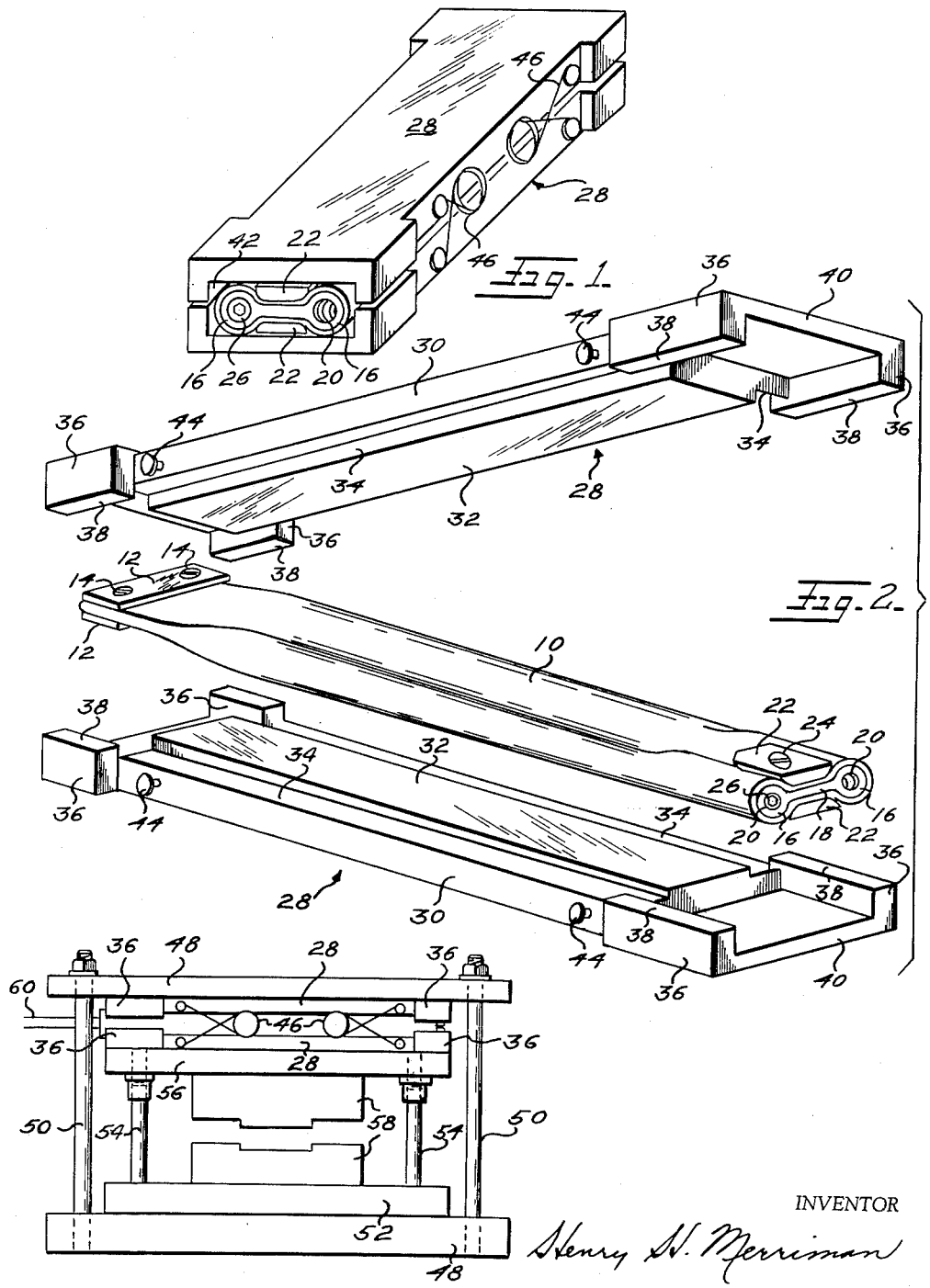

The invention relates to an expansion unit operated by fluid pressure and particularly pertains to a fluid expansion unit employing a flexible hose as the expansible member.

Conventional fluid expansion units take the form of piston and cylinder arrangements wherein pressure within the cylinder chamber is converted to a working movement through the resultant rleative movement of the piston and cylinder components. The working force of the unit of the invention is produced by inflation of a flexible wall chamber, such as a length of fire hose, wherein the chamber assumes a flattened shape under normal atmospheric pressure conditions within the chamber and assumes an elliptical or cylindrical cross section upon pressurized fluid being introduced into the chamber. As the dimensions of the flexible walled container vary when in the deflated and inflated form work may be accomplished by utilizing this change in dimension under the fluid pressure, namely the increase in dimension of the chamber in the direction at right angles to the plane of the flattened condition. An actuator of this type has several important advantages over cylinder and piston construction; for instance, a flexible chamber in the form of an elongated hose is capable of producing an equal pressure throughout its entire length, thus where it is desired to impress a force equally along the length of an elongated member an actuator of this type automatically can produce the desired uniform force while the use of cylinders and pistons would create unequal pressures at localized points. Another advantage of such an expansion unit is the large forces which can be produced with a modest fluid pressure due to the large effective pressure area afforded by the hose as all internal forces acting on the hose wall having vectors in a direction at right angles to the plane of the flattened form aid in producing the working force. Other advantages of this type of actuator result from the compactness produced by this construction and the comparative low cost with which actuators of equal capacity to conventional cylinder and piston constructions may be manufactured.

It is thus an object of the invention to provide an expansion unit utilizing a flexible walled pressure chamber which may be used in a variety of applications wherein a linear working movement is desired.

Another object of the invention is to provide a housing and retaining unit for a flexible walled fluid actuator whereby the expansion of the actuator may be utilized and the actuator chamber is protected against damage.

A further object of the invention is to provide a standard unit for use with an expansible flexible walled fluid actuator which may be produced in various sizes and which may be readily employed in most applications wherein it is desired to use an actuator of the expanding type.

Yet another object of the invention is to provide a fluid expansion unit employing a flexible hose wherein the hose is maintained in position by the unit and wherein means are provided for aiding return of the hose to a flattened configuration upon exhausting the pressure within the hose.

These and other objects of the invention resulting from the construction and relationship of the components will be apparent from the following description and accompanying drawings wherein:

FIG. 1 is a perspective view of an expansion unit in accord with the invention in the retracted state, FIG. 2 is an exploded perspective view of the primary components of the expansion unit of the invention, and FIG. 3 is an elevational view of one application wherein the unit of the invention may be employed showing use of the unit with a die set.

The actuator of the invention consists of a flexible hose represented at 10. The hose is preferably of the fire hose type consisting of an elastomer inner liner which may be cured in a flattened form. An outer layer of reinforcing fabric encompasses the inner liner, this fabric is relatively non-stretchable, highly flexible and preferably not bonded to the inner layer in the interest of compact folding and flexibility. A hose of this nature assumes a flattened configuration when not subjected to internal fluid pressure, and may be coiled upon itself. The hose itself forms no part of the invention and conventional hose of the type described may be employed with the invention.

The hose 10 is cut to the desired length and the ends thereof sealed by end fittings of flattened or elongated cross section. Two such fittings are shown in FIG. 2 wherein one end of the hose 10 is sealed by a pair of clamping plates 12 pinching the end of the hose together under the influence of bolts 14. The other end of the hose is closed by a fitting consisting of a pair of cylindrical nipple portions 16 interconnected by a web 18. The nipple portions 16 are provided with axial fluid passageways 20 extending through the fitting and are threaded for affixing a supply conduit of fluid pressure to the passageways 20 permitting the hose 10 to be inflated or deflated as desired. A pair of clamping plates 22 drawn toward each other by a bolt 24 press the hose into sealing engagement with the web which wraps the hose tightly about cylindrical portions 16 preventing escape of the fluid around the end fitting. It may be desired to use only one of the passageways to conduct fluid into the hose 10 and in such event a plug 26 may be used to seal the unused passageway. Hoses of considerable length preferably employ both passageways because of the increased flow capacity provided. A variety of possible hose coupling constructions may be employed with the expansible unit of the invention and my co-pending applications 661,506 filed May 24, 1956, now U.S. Patent 2,976,888 issued Mar. 28, 1961, and 771,078, filed October 31, 1958, disclose details of types of end fittings or couplings which are preferred.

As observed in FIG. 3, the form of the hose 10 is elongated and flattened when in the deflated condition and as the working stroke of the actuator of the invention results from the change of dimension occurring in the hose cross section when inflated the member lifted or moved by the actuator engages the outer surface of the hose when in both the deflated and inflated conditions. Ideally the hose is engaged throughout the entire flattened periphery areas such that the unit pressure between the hose and the engaged member will be of the lowest possible value for a given total actuator force to prevent damage to the hose and it is also desirable that means be provided to prevent excessive pinching of the folded edges of the hose when in the deflated condition. The structure illustrated accomplishes these purposes in a simple yet effective manner and it is intended that the constructional characteristics of the unit illustrated in the drawings may also be employed where the hose directly engages the components of clamp, die or other elements being actuated.

The hose engaging elements of the actuator unit consist of a pair of identical shoes 28 adapted to engage the hose 10 on the opposite flattened sides thereof. The shoes 28 may be formed from castings machined or fabricated by conventional manufacturing methods and consist of an elongated substantially rectangular block 30 having a planar hose engaging surface 32 thereon. The length of the surface 32 is substantially equal to that of the flattened portion of the unsupported hose, but terminates short of the end fittings such that the nipple portion will not be sandwiched intermediate the surfaces 32 of the opposed shoes 28. The longitudinal inner edges of the blocks 30 are recessed as at 34 for their entire length to provide relief for the folded edges of the hose when in the flattened or deflated condition. The transverse width of surfaces 32 will therefore be less than the transverse width of the flattened hose such that the edges of the hose will project over the recesses 34. This use of relief for the folded portion of the hose is important in extending the life of the hose as the clearance provided by the recesses prevents excessive fatigue and folding of the hose at the point subjected to the greatest degree of flexing, e.g. the folded edge of the hose.

Each end of the shoes 28 is formed with an end fitting receiving portion formed integral with the block 30. The end fitting portion consists of a pair of longitudinal extending wall 36 provided with an abutment surface 38 and interconnected by a web 40 to define a chamber 42 when the opposed blocks are fitted together as in FIG. 1. The inner surface of the web 40 is sufficiently removed from the plane of the surface 32 to provide sufficient dimension of chamber 42 whereby the end fittings will not interfere with operation of the shoes 28. The location of the walls 36 with respect to the recesses 34 is such that the walls are a greater distance from the longitudinal axis of the shoes than the recesses to prevent interference with the function of the recesses, note FIG. 1, and the abutment surfaces 38 of the walls 36 of the opposed shoes will engage each other to limit the degree which the hose 10 may be flattened and determine the minimum height of the unit.

The sides of block 30 are provided with a pair of headed studs 44 and a pair of hair pin type springs 46 may be arranged on each side of the unit affixed to the studs 44 to bias the shoes 28 toward each other and maintain the hose and shoes in assembled relation.

In operation, a fluid supply conduit is affixed in communication with one or both of the passageways 20, if one passageway is used the other is plugged as described, and the assembled unit is placed as desired whereby inflation of the hose 10 forces the shoes 28 apart and produces the working stroke. Due to the uniform force distribution in the hose the shoes 28 will move in a linear parallel relation away from each other and upon deflation of the hose the shoes will be brought toward each other due to the springs 46 or other forces acting on the shoes.

One example as to how the fluid actuator unit of the invention may be employed is illustrated in FIG. 3 wherein an inexpensive press may be easily assembled by using conventional components in conjunction with the actuator unit. The press may be constructed by maintaining a pair of parallel, spaced backing plates 48 in relation by tie rods 50. A conventional forming or cutting die structure consisting of lower shoe 52, guide pins 54 and upper shoe 56 vertically movable upon the pins 54 is interposed between plates 48 and the die halves 58 are affixed to the shoes 52 and 56.

A fluid actuator of the type described is inserted between the upper shoe 56 and the upper blocking plate 48 and connected to a fluid supply source conduit 60. Preferably spring means, not shown, are used to bias the upper shoe 56 in an upward direction maintaining the components as shown in FIG. 3 when the hose of the actuator is deflated. Upon introducing pressurized fluid, either compressed air or hydraulic oil, into the hose the shoes 28 of the unit will move apart due to the tendency of the hose to assume a cylindrical shape with attendant downward movement of the upper die shoe 56 producing the working movement of the upper die half to form or cut material between the dies. Exhausting the fluid pressure within the hose returns the actuator to the closed position due to the influence of the spring acting on the upper shoe 56 and the springs 46. If desired several actuator units may be employed with such a press to increase the working pressure.

High expanding forces may be produced with an actuator of the described type with relative low fluid pressures because of the large effective pressure area presented by the flexible hose and by using the desired hose length and regulating the pressure of the fluid supply the forces exerted by the actuator may be carefully controlled through wide ranges. In installations where a greater working stroke is desired than can be obtained by using a single actuator, a larger working movement may be achieved by "stacking" a plurality of the actuators such that the total stroke will be the sum of each actuator movement. The actuator of the invention provides an inexpensive expansible unit of very concise construction which may be readily used in most applications where an expanding power working movement is desired and it will be readily appreciated that the length and width of the components of the actuator may be varied as desired to accommodate various sized hoses or to meet the particular application without departing from constructional advantages provided by the invention.

It is intended that the invention not be limited to the illustrated and described embodiments and that the scope of the invention be defined only by the following claims.

I claim:

1. In an expansible fluid motor unit adapted to communicate with a pressurized fluid source, an elongated, expandable, flexible walled chamber, including a pair of fittings attached to the ends thereof, in communication with the pressurized fluid capable of assuming a flattened deflated configuration having opposed sides and a pair of folded edges, a pair of rigid elongated, parallel chamber engaging members disposed on opposite sides of said chamber, a planar chamber engaging surface formed on each of said members in engagement with one of the opposed sides of said chamber, means defined on said chamber engaging members operatively receiving and associated with said fittings maintaining the alignment between said chamber and chamber engaging members and biasing means interposed between said chamber engaging members biasing said members into engagement with said chamber and maintaining the assembly of said unit.

2. In an expansible power unit as in claim 1 wherein abutment means are provided on said members, the abutment means of each member being in opposed engagable relation with the abutment means of the other whereby their engagement determines the minimum spacing between said members and the planar chamber engaging surfaces thereof.

3. In an expansible motor unit adapted to communicate with a pressurized fluid source, an elongated flexible walled hose capable of assuming a flattened configuration having opposed sides and a pair of folded edges, fitting means sealing the ends of said hose, a passageway defined in at least one of said fittings in communication at one end with the chamber defined within the hose and in communication at the other end with the pressurized fluid source, a pair of rigid elongated hose engaging members, a hose engaging surface formed on each of said members in engagement with one of the opposed sides of the hose, a pair of elongated longitudinally extending recesses defined in at least one of said surfaces adapted to receive the folded edges of the hose, recesses defined at the ends of at least one of said members to receive said fitting means and means maintaining said hose and hose engaging members in assembled relation.

4. In an expansible motor unit as in claim 3 wherein said folded edges receiving recesses and said fitting receiving recesses are defined in both of said hose engaging members.

5. In an expansible motor unit as in claim 4 wherein said fitting receiving recesses are defined by a pair of wall elements interconnected by a web member and an abutment surface formed on said wall elements whereby the abutment surfaces of each hose engaging member will engage to determine the minimum spacing between said hose engaging members.

6. In an expansible motor unit adapted to communicate with a pressurized fluid source, an elongated, expandable, flexible walled hose capable of assuming a deflated flattened configuration having opposed sides and a pair of longitudinal folded edges, fittings affixed to and sealing the ends of the hose, said fittings being of a generally flattened configuration and maintaining the ends of the hose in a substantially flattened form, a passageway defined in at least one of said fittings in communication at one end with the chamber defined within the hose and in communication at the other end with the pressurized fluid source, a pair of rigid elongated hose engaging members, a hose engaging surface formed on each of said members in engagement with one of the opposed sides of the hose, a pair of elongated longitudinally extending recesses defined in at least one of said surfaces adapted to receive the folded edges of the hose, recesses defined in said hose engaging members adjacent the ends of said hose engaging surfaces receiving said fittings, said surfaces being of a longitudinal length substantially equal to that of the expandable portion of said hose, wall elements defined on said hose engaging members defining the width of said fitting receiving recesses and extending at right angles to the plane of said hose engaging surfaces and means maintaining said hose and hose engaging members in assembled relation.

7. In an expansible motor unit as in claim 6 wherein an abutment surface is defined and disposed on each of said wall elements whereby the abutment surfaces of one hose engaging member are in opposed and selectively engageable relation to the abutment surfaces of the other hose engaging member and engage to determine the minimum spacing between said hose engaging surfaces.

References Cited in the file of this patent

UNITED STATES PATENTS

| 401,950 | Haussmann | Apr. 23, 1889 |
| 1,928,368 | Coffey | Sept. 26, 1933 |
| 2,428,619 | Douglas | Oct. 7, 1947 |

FOREIGN PATENTS

| 131,864 | Germany | July 3, 1902 |
| 546,884 | Germany | Mar. 19, 1932 |
| 735,346 | Germany | May 12, 1943 |
| 3,742 | France | Dec. 16, 1904 |
| 222,183 | Switzerland | Oct. 1, 1942 |